(12) United States Patent
Andersen (10) Patent No.: US 9,080,346 B2
(45) Date of Patent: Jul. 14, 2015

(54) TOWER SECTION STORAGE (71) Applicant: SIEMENS AKTIENGESELLSCHAFT, München (DE)

(72) Inventor: Birger Andersen, Ry (DK)

(73) Assignee: SIEMENS AKTIENGESELLSCAFT (DE)

(*) Notice: Subject to any disclaimer, the term of this patent is extended or adjusted under 35 U.S.C. 154(b) by 0 days.

(21) Appl. No.: 14/274,795

(22) Filed: May 12, 2014

(65) Prior Publication Data
US 2015/0013242 A1 Jan. 15, 2015

(30) Foreign Application Priority Data

Jul. 11, 2013 (EP) .................................. 13176123

(51) Int. Cl.
B66C 23/34 (2006.01)
E04H 12/34 (2006.01)
F03D 11/00 (2006.01)
F03D 1/00 (2006.01)
E02D 27/42 (2006.01)
E04H 12/00 (2006.01)
F03D 11/04 (2006.01)
E04H 12/08 (2006.01)
E04H 12/18 (2006.01)

(52) U.S. Cl.
CPC ............ *E04H 12/342* (2013.01); *E02D 27/425* (2013.01); *E04H 12/00* (2013.01); *E04H 12/08* (2013.01); *E04H 12/185* (2013.01); *F03D 1/005* (2013.01); *F03D 11/00* (2013.01); *F03D 11/045* (2013.01); *F05B 2240/14* (2013.01); *F05B 2240/912* (2013.01); *F05B 2260/02* (2013.01)

(58) Field of Classification Search
CPC .......... E04G 1/24; E04H 12/10; E04H 12/342
USPC ........................ 52/123.1, 745.03, 745.04, 736
See application file for complete search history.

(56) References Cited

U.S. PATENT DOCUMENTS

| 294,860 | A | * | 3/1884 | Dye ................................. 182/51 |
| 4,212,015 | A | * | 7/1980 | Graf et al. ...................... 343/883 |
| 4,569,416 | A | * | 2/1986 | Stokoe ............................ 182/2.9 |
| 5,184,502 | A | * | 2/1993 | Adams et al. ................ 73/31.01 |

(Continued)

FOREIGN PATENT DOCUMENTS

| DE | 29510415 U1 | 8/1995 |
| EP | 2444656 A2 | 4/2012 |

(Continued)

OTHER PUBLICATIONS

European Search Report issued Nov. 27, 2013; Application No. 13176123.1; 7 pgs.

*Primary Examiner* — Basil Katcheves
(74) *Attorney, Agent, or Firm* — Schmeiser Olsen & Watts LLP (57) ABSTRACT A tower section storage device for storing a tower section of a wind turbine tower is provided. The device comprises a central body frame defining a center point, at least three feet, and at least three tower section receiving areas (9, 9a, 9b, 9c) connected to the central body frame. All of the feet are connected to the central body frame such that they are moved away from and/or towards the center point. A method for storing a tower section, in particular of a wind turbine tower by means of such device is also provided.

15 Claims, 5 Drawing Sheets

(56) References Cited

U.S. PATENT DOCUMENTS

| | | | |
|---|---|---|---|
| 5,531,419 A * | 7/1996 | Gustafsson et al. | 248/519 |
| 6,446,408 B1 * | 9/2002 | Gordin et al. | 52/632 |
| 7,105,940 B2 * | 9/2006 | Weesner et al. | 290/44 |
| 7,230,819 B2 * | 6/2007 | Muchow et al. | 361/601 |
| 7,246,782 B2 * | 7/2007 | Crookham et al. | 248/519 |
| 8,299,645 B2 * | 10/2012 | Muchow et al. | 290/55 |
| 8,584,429 B2 * | 11/2013 | Zavitz et al. | 52/745.18 |
| 2005/0218657 A1 | 10/2005 | McMillan | |
| 2010/0207452 A1 * | 8/2010 | Saab | 307/65 |
| 2010/0293781 A1 | 11/2010 | Chan | |
| 2010/0319276 A1 | 12/2010 | Kryger et al. | |
| 2013/0205711 A1 | 8/2013 | Heltoft et al. | |

FOREIGN PATENT DOCUMENTS

| WO | WO 2009097858 A1 | 8/2009 |
|---|---|---|
| WO | WO 2012003831 A2 | 1/2012 |
| WO | WO 2012007226 A2 | 1/2012 |

\* cited by examiner

TOWER SECTION STORAGE

CROSS-REFERENCE TO RELATED APPLICATIONS

This application claims priority to EP Application No. 13176123.1, having a filing date of Jul. 11, 2013, the entire contents of which are hereby incorporated by reference.

FIELD OF TECHNOLOGY

The following relates to a tower section storage device for storing a tower section of a wind turbine tower. It also concerns a method for storing such tower section.

BACKGROUND

Due to their dimensions, wind turbine towers, in particular metal (e.g. steel) towers, are comprised of several tower sections or tower segments. A tower section is hereby referred to throughout this description as a part of a tower along the longitudinal extension of the tower, i.e. in an assembled state of the wind turbine along its extension from the ground to a nacelle (at which there is assembled the rotor of the wind turbine).

Tower shell parts in contrast are considered to be parts of the tower along its circumference. Often, a tower section comprises a plurality of shell parts. Therefore, to construct a tower, typically, first the shell parts have to be interconnected (for instance via adjacent vertically orientated inner flanges of the shell parts which are bolted together) to form a tower section and then the tower sections have to be placed on top of one another to form the tower. During that process they can again be bolted together via adjacent outer or inner (horizontal) flanges of two tower sections.

Such a wind turbine tower with sections and shell parts is for instance described in the international patent application WO 2009/097858 A1. The assembly of the tower can for instance be accomplished by means of an assembly rig such as then one described in the international patent application WO 2012/007226 A2.

During assembly of such tower sections on an assembly rig such as the one described in the above-given reference, there is currently a handling problem. The tower section can either be immediately lifted or raised and installed on top of the preceding tower section so as to form the tower or it needs to be stored temporarily on the ground until a sufficient raising or lifting means such as a crane is available to take it to its designated position on top of a preceding tower section.

In particular, the upper tower sections which are to be installed to form the top part of the tower (or a part slightly below that top part) require very tall and thus expensive cranes for installation. Thus, if all tower sections have to be transported right to their point of installation such crane must be available throughout the complete construction time of the tower. This implies a lot of waiting time of such cranes, which means a great waste of resources and expenditure.

The alternative to temporarily store the tower sections on the ground is presently not possible because there is a severe danger of injuring the tower section while placing them on the ground or during storage on the ground. In particular, the tower sections are normally delivered to the assembly site in such a state in which the tower shell parts have been interconnected in order to form the tower section and in which the tower section has been painted (at the manufacturer's site) with a finish, also on all of their distal edges. It is very important that the paint or finish stays intact after the installation of the tower section and thus during storage of the tower section.

SUMMARY

It is thus the object of the present invention to provide a solution of how to effectively store a tower section, in particular a tower section of a wind turbine, such that the tower section rests as safe as possible from injuries.

This object is met by a tower section storage device according to claim 1 and by a method according to claim 14.

Accordingly, a tower section device of the above-mentioned kind comprises:
a central body frame defining a center point,
at least three feet, and
at least three tower section receiving areas connected to the central body frame, whereby all of the feet are connected to the central body frame such that they can be moved away from and/or towards the center point.

The central body frame thereby can be any mechanical frame construction which provides enough stability to hold the feet. It need not necessarily have a round shape, but advantageously has. It also need not necessarily be stable enough to (completely) bear the load of the tower section as this can also be accomplished by the feet alone or (as is sometimes preferred) by the central body frame together with the feet. The center point defined by the central body frame may be its center of gravity. If the central body frame has an essentially round, i.e. circular, shape (amongst which there also count oval shapes or the like) its shape may define the center point as being the center point of that circle.

The tower section may rest directly or indirectly on the at least three feet. Thereby, as mentioned, the three feet can be supported in carrying the load of the tower section by the central body frame. For that purpose, the feet may be connected to the central body frame, directly or (as may be provided for reasons of flexibility) indirectly, for instance (as will be explained further below) via beams which may interconnect the feet and the central body frame.

The tower section receiving areas may constitute the interfaces at which the tower section is connected to the device. They may be connected indirectly to the central body frame, directly to the feet and/or to connection means between the feet and the central body frame such as the beams mentioned above. The tower section receiving areas may be realized and positionable such that a particular selected part or region of the tower section can be brought in contact with them. Such selected part or region may be one which is particularly stable and thus not in substantial danger of getting injured during contact with the tower section receiving areas or may be such a part or region which can be repaired—that includes repainting—easily right on the spot in case of an injury.

According to the described aspects, the feet may be connected to the central body frame in such way that they can be moved to and fro with respect to the center point of the central body frame. That means that there may be a great flexibility for the feet as their position can be adjusted with respect to the center point. This may have the effect that no matter which diameter and longitudinal extension the tower section has which is to be stored, the feet can be positioned such that they permit a placement of the tower section on the device. This may apply in two respects:

Firstly, the diameter of the tower section may make it necessary that the feet do not stand in the way of the tower section. Therefore, the feet may need to be placed at a sufficient distance from the center point of the device to accommodate the tower section's diameter.

Secondly, the larger the longitudinal extension of the tower section (i.e. along its essentially tubular shape), the higher up may likely be the center of gravity of the tower section during storage. Therefore, it can be necessary to place the feet even further away from the center point of the device than just to accommodate the diameter.

All these necessary adjustments may be possible with the movable feet of the device according to the described aspects. Therefore, described aspects can provide a flexible device for virtually all sizes of tower sections.

Certainly, the device according to the described aspects (and thus also the method according to the described apsects) can be realized to store more than one tower section at a given time. The tower sections can for instance be interconnected and then be placed onto the device or a first tower section is placed on the device and additional tower sections are then placed onto the first tower section.

The described aspects also concern an assembly comprising a tower section, in particular of a wind turbine tower, and a device.

According to the described aspects, the method of the above-mentioned kind may comprise the step of placing (and possibly temporarily fixing) the tower section on a tower section storage device.

Further, the described aspects also concern a transport method for transporting a tower section, in particular of a wind turbine tower, which may comprise the steps of storing the tower section according to the described aspects and then transporting the tower section on the device. That means that in essence an assembly according to the described aspects may be transported.

Particularly advantageous embodiments and features of the described aspects are given by the dependent claims, as revealed in the following description. Features of different claim categories may be combined as appropriate to give further embodiments not described herein.

As for the tower section receiving areas, these may be connected to the central body frame such that they can be moved away from and/or towards the center point. That may imply that not only the feet can be moved relative to the central body frame but also the tower section receiving areas so that they can accommodate much easier a tower section to be placed upon the device.

Thereby, the movement of the feet and the tower section receiving areas may be independent, i.e. it may not be necessary that upon movement of the feet the tower section receiving areas will also move and vice versa. That way, for instance the feet can be positioned very far apart from each other—for instance to provide an overall wide enough basis for a comparatively high tower segment with a high center of gravity—whilst the tower section receiving areas can be placed independently from the position of the feet to provide for an interface to the tower section in dependence of the latter's diameter.

A movement of the tower section receiving areas may be coupled to a movement of the feet, such that a tower section receiving area each may be connected to a corresponding foot at a predefined position relative to the corresponding foot. For instance, the tower section receiving area(s) can be directly connected to the foot/feet so that the position of the foot is essentially the same (with reference to the direction towards or from the center point) as that of the tower section receiving area. That means that by adjusting the position of the foot to a certain diameter of tower section, the tower section receiving area may also be automatically brought into position to receive the tower section properly.

Further, it can be particularly advantageous if at least two of the feet are connected to the central body frame such that they can be moved, i.e. tilted along an angle of a circle which circle is defined by the center point of the central body frame. Thus the circle and the central body frame may have the same center point so that the circle runs along a line which is equidistant at every point of the line from the center point, that equidistance being the radius of the circle.

With such a measure the flexibility of the device may further be increased by adding a movability of the feet in a "sideways" fashion along the circle. This way the angles between adjacent legs can be adjusted, for instance to be substantially equal, no matter which diameter is selected. In case of a device with three legs and three corresponding tower section receiving areas each of which are aligned along one beam, the beams may describe a kind of Y-shape whereby each leg of the Y can describe an angle of 120° with respect to the adjacent one.

In addition, described embodiments may help to cater for tower sections with different numbers of shell parts. For instance, lower tower sections of a wind turbine tower may have 18 shell parts, middle tower sections thereof may have 16 shell parts and upper tower sections may have 14 shell parts. If one connects the tower sections to the tower sections receiving areas at a connection between shell parts being able to move the feet "sideways" in the above-described fashion may help to be able to connect the device to such interconnections of shell parts irrespective of the number of shell parts in one tower section.

The angle along which the feet can be moved basically defines the degree of flexibility, it may be configured and provided such that in every position of the foot along the circle the device stand stably on the ground. With such an embodiment it may be easier to adjust the device (i.e. the position of the feet) even to very large diameters.

According to an embodiment, at least one of the feet, may be connected to the central body frame via a beam which beam may engage with a number, i.e. typically one or two, of corresponding openings of (i.e. in) the central body frame. The beam may thus hold the foot in position. It can be slid in and out of the central body frame. Such construction can be particularly mechanically stable. The beam may be a metal beam, such as a steel beam (for reasons of stability).

In that context, at least one beam may engage with at least two corresponding openings of the central body frame. Such corresponding openings can for instance be positioned at two opposite sides of the central body frame, i.e. one facing towards the foot connected to the beam and one opening facing opposite. Such construction may help to hold the beam(s) more stably as the beam(s) protrude(s) at either sides of the central body frame therefrom and may thus be stabilized at these two sides by the openings. Such construction may avoid some uncontrolled bending or twisting forces on the beam(s) once the load of the tower section is inflicted on them. Alternatively or additionally, the beam(s) may be guided at an inner side of the central body frame through a holding element extending from an opening facing towards the foot into the inner side of the central body frame. Such holding element may be a hollow shell in which the beam is situated, it may also be open at at least one side (at least partially). A function of the holding element may be to guide the beam safely at the inner side of the central body frame, which means that it may be realized such that it can serve that function.

The opening of the central body frame corresponding to at least one of the beams can be shaped such that an inner extension of the opening along a circle which is defined by the center point may be larger than the extension in the same direction of the beam which may be held in the opening. This may be a useful way of how to realize the embodiment according to which at least two of the feet are connected to the central body frame such that they can be moved, i.e. tilted along an angle of a circle which circle is defined by the center point of the central body frame. The larger opening may provide for the necessary tolerance for the movement of the beam and at the same time a sufficient stability of accommodation of the beam.

The described aspects can further be enhanced by the device comprising fixing means to temporarily fix the feet—possibly via the beams—and/or the tower section receiving areas in a desired position with respect to the central body frame in at least one direction of movement. Such fixing means may comprise bolts and/or locks or the like which keep the feet (and/or the beams and thus indirectly the feet) in a desired position. An undesired movement of the feet and/or the tower section receiving areas in particular during the storage of tower sections can thus be effectively avoided, which, again, may provide for a higher stability of the device and/or of the connection between the device and the tower section which it carries.

As for the tower section receiving areas at least one of them, may be tiltable in at least one of the following directions:
- along a first essentially horizontal axis towards and away from the center point,
- along a second essentially horizontal axis perpendicular to the first horizontal axis.

The two mentioned horizontal axes may refer to a situation in which the device according to the invention is placed on the ground in a desired operation position, i.e. in such way that a tower section can be placed on it in a stable manner. In such position, the feet may all be placed on the ground.

Because the tower section receiving areas may be tiltable in at least one of these directions, they may be more flexible to correctly and safely accommodate the tower section. The flexibility in particular may provide for the tolerance during the process of placing the tower section onto the device.

The tower section receiving areas may have virtually any shape suitable to accommodate a corresponding part or region of the tower section, for instance a flat surface onto which the tower section can be placed. At least one tower section receiving area may comprise a V-shaped interface corresponding to a countershape of a flange connection of two adjacent tower shell parts of the tower section to be stored. In other words, the tower section receiving area, in particular its connecting interface to the tower section, may be shaped such that it corresponds with a countershape of the tower section at the part or region which is to be connected to the tower section receiving area. This may result in a form fit connection between the connecting interface and the tower section's part or area. Flange connections of adjacent tower shell parts are particularly handy to use as such countershape as they are often situated at the inside of the tower section and thus not subject to weather influences during operation of the wind turbine. Therefore, should such part or region of the tower section be injured, it may not necessarily mean that the whole tower section has to be replaced, repaired or repainted. In addition, the flange connection can be further solidified, for instance by galvanizing it and/or by attaching a plastic protection cover to it permanently or non-permanently. At the same time, the flange connections may protrude from the inner circumference of the tower section so that they can easily be placed such that they fit with the interface.

In addition, the device can comprise an interface to a raising machine and/or a lifting machine, such as to a forklift. Such an interface may thereby be positioned in the central body frame—for instance in order to provide a higher stability during a raising or lifting process as the center of gravity of the device may be within the extension of the central body frame. A forklift interface can for instance comprise two rails within the central body frame along which the two forks of the forklift can be led. Via such an interface, the device can be transported, possibly together with the tower section, i.e. as an assembly according to the invention.

As already outlined above, such assembly may be realized such that the tower section may be connected to the tower section receiving areas of the device via a flange connection of two adjacent tower shell parts of the tower section. Furthermore, the tower section may be positioned on the device in essentially the same orientation as its designated orientation when assembled as part of a tower. In other words, the tower section may be positioned upright on the device, i.e. with its longitudinal extension defined by the tubular shape of the tower section being orientated essentially vertically. That means that a first opening of the tower section which is to face another tower section (or the nacelle) in an assembled state of the tower section may face downwards whereas the other, second opening (which may essentially serve the same connection purpose with respect to another tower section or the nacelle) may face upwards. Thereby, if one of the openings of the tower section has a smaller diameter than another of the openings, the latter may be positioned upwards and the former downwards—as may be the case if the tower section was assembled together with other tower sections to a tower.

BRIEF DESCRIPTION

Some of the embodiments will be described in detail, with reference to the following figures, wherein like designations denote like members, wherein.

DETAILED DESCRIPTION

Figure 1:
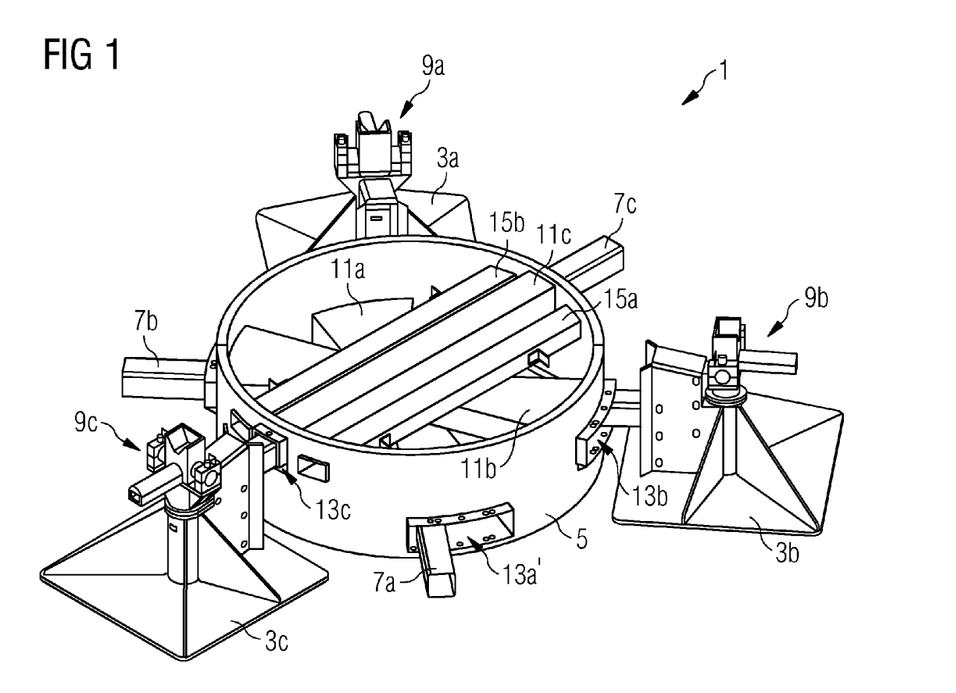
FIG. 1 shows a perspective view of a tower section storage device according to a described embodiment.
Figure 2:
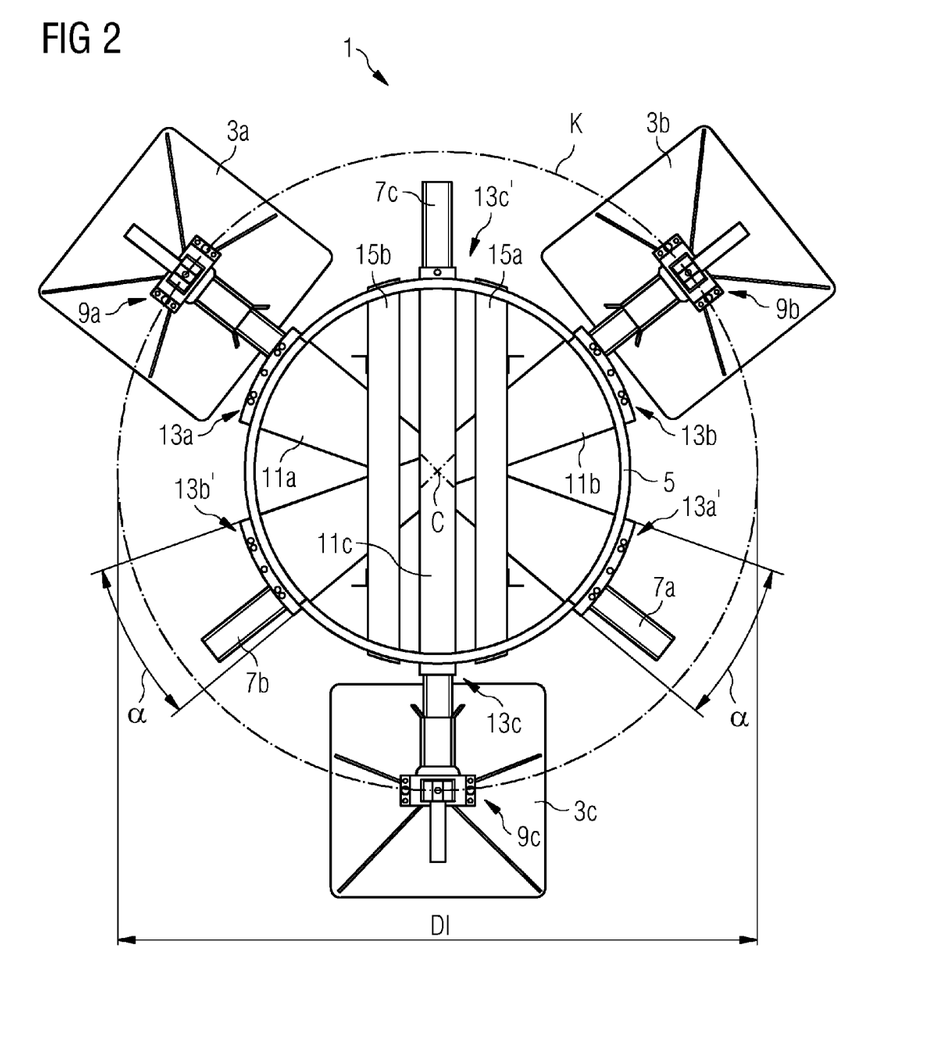
FIG. 2 shows a top view of the same device.

FIGS. 1 and 2 show a tower section storage device 1 according to a described embodiment. It comprises an essentially circular metal central body frame 5, three feet 3a, 3b, 3c, and three beams 7a, 7b, 7c which connect the feet 3a, 3b, 3c with the central body frame 5. On top of the feet 3a, 3b, 3c there is each positioned a tower section receiving area 9a, 9b, 9c which provides an interface at which a tower section of a wind turbine tower can be connected to the device 1. The beams 7a, 7b, 7c are led through openings 13a, 13a', 13b, 13b', 13c, 13c' in the central body frame 5 and through holding elements 11a, 11b, 11c within the central body frame's 5 extension realized as hollow shells 11a, 11b, 11c through which the beams 7a, 7b, 7c are led. The first beam 7a thus enters the central body frame 5 through a first front opening 13a, is then held by the first shell 11a and leaves the central body frame 5 through a first opposite opening 13a' facing to the other side of the central body frame 5 than the first front opening 13a. The second beam 7b enters the central body frame 5 through a second front opening 13b, is then held by the second shell 11b and leaves the central body frame 5 through a second opposite opening 13b' facing to the other side of the central body frame 5 than the second front opening 13b. The third beam 7c enters the central body frame 5 through a third front opening 13c, is then held by the third shell 11c and leaves the central body frame 5 through a third opposite opening 13c' facing to the other side of the central body frame 5 than the third front opening 13c.

The circular central body frame 5 defines a center point C (cf. FIG. 2), namely the center point C of its circular shape and also its center of gravity C. From this center point C there can be derived a second circle K along which the feet 3a, 3b, 3c can be arranged together with the tower section receiving areas 9a, 9b, 9c. That circle K is defined by the center point C and a variable diameter DI. That means that the feet 3a, 3b, 3c are moved towards and away from the center point C of the central body frame 5 and thus of the circle K. In other words, the circle K can be enlarged or reduced by reducing the diameter DI.

Furthermore, the first and second beams 7a, 7b, unlike in this case the third beam 7c, can be moved, i.e. tilted, along a predefined angle a of the circle K. For that purpose, the first and second openings 13a, 13a', 13b, 13b' are wider than the width of the first and second beams 7a, 7b, i.e. their extension along the circle K is larger than that of the first and second beams 7a, 7b.

All the measures to make the feet 3a, 3b, 3c and thus the tower section receiving areas 9a, 9b, 9c moveable serve the purpose of being able to adjust their position to the positions of corresponding interfaces of the tower section (not shown) to be stored on the device 1. At the same time, the whole construction is held stable enough to bear the weight of such tower section.

Further, it can be seen that the device 1, namely the central body frame 5 comprises an interface to a forklift (not shown) which interface comprises two rails 15a, 15b along which the forks of the forklift can be guided inside of the central body frame 5. The rails 15a, 15b are hollow beams with openings at either side which openings extend through the central body frame 5 so that they are accessible by the forklift from outside.

Figure 3:
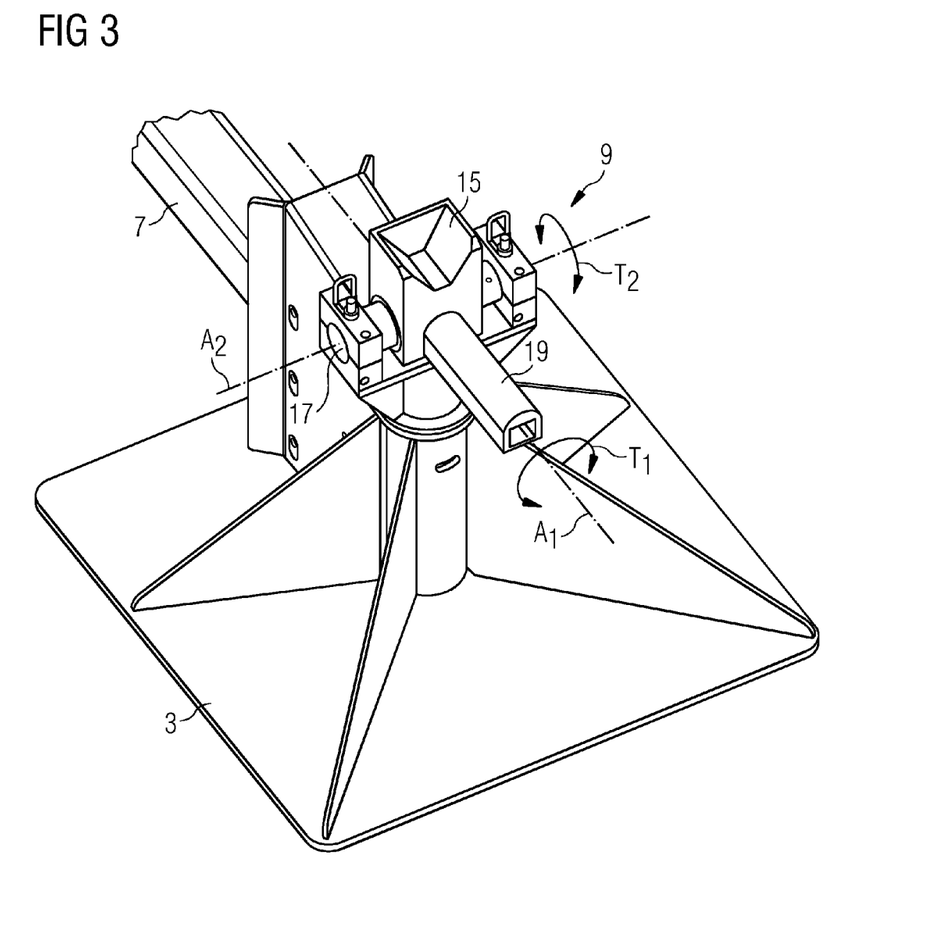
FIG. 3 shows a perspective view of a detail of the same device.

FIG. 3 shows in more detail a tower section receiving area 9 such as the ones shown in FIGS. 1 and 2, resting on a foot 3 which is connected to a beam 7. The tower section receiving area 9 comprises a V-shaped interface 15 which is tilted in two directions $T_1$, $T_2$ along two axes $A_1$, $A_2$: A first horizontal axis $A_1$ is parallel or coaxial to the beam 7. A second horizontal axis $A_2$ is perpendicular to the first axis $A_1$. This way, a corresponding interface of the tower section to be connected to the tower section receiving area 9 via the interface 15 can be brought into an exact form fit with that interface 15 by slightly tilting the interface 15 along one or both of the axes $A_1$, $A_2$.

Figure 4:
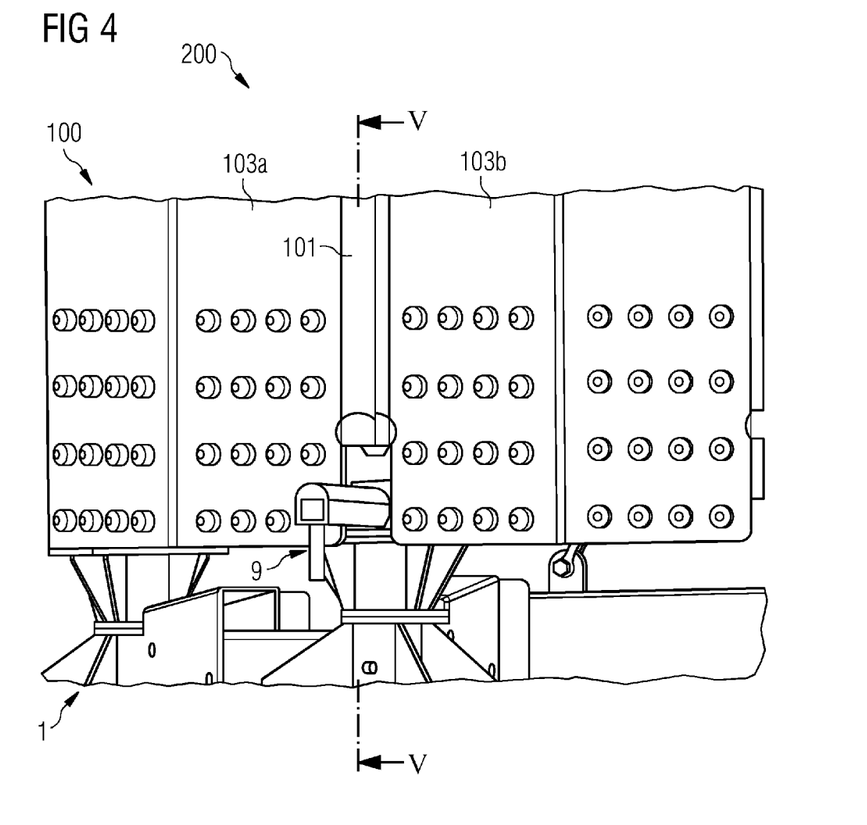
FIG. 4 shows a side view of a tower section placed on the same device.
Figure 5:
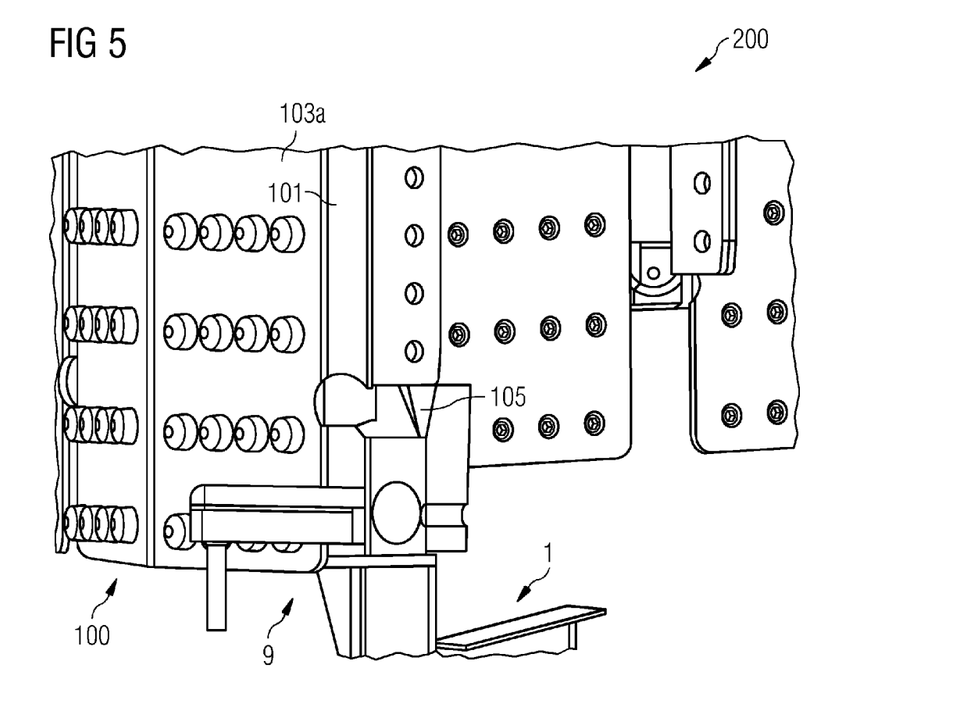
FIG. 5 shows a section view along a section line V-V of the same tower section as in FIG. 4 and of the same device.

FIGS. 4 and 5 show such tower section 100 placed on the device 1 and thus forming together with it an assembly 200. The tower section 100 comprises a number of shell parts 103a, 103b which are interconnected along an inner flange connection 101. The galvanized lowest part of that flange connection (cf. FIG. 5) is also V-shaped and thus fits into the interface 15 of the tower section receiving area 9. This helps to firmly hold the tower section 100 in place during storage on the device 1.

Figure 6:
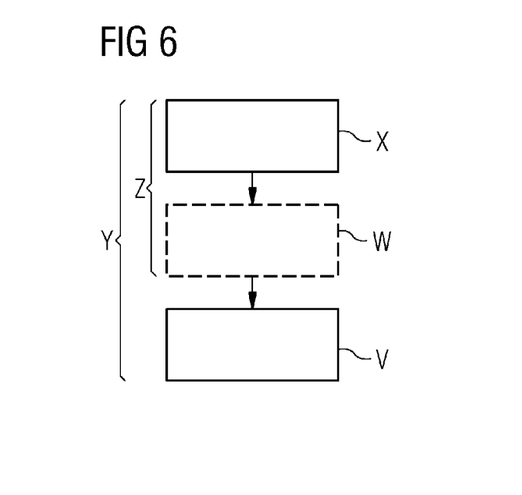
FIG. 6 shows a schematic block diagram of embodiments of the methods.

Referring to FIG. 6, there are shown the two steps X, W of a method Z for storing a tower section 100 of a wind turbine tower. Throughout this figure, reference is made to the embodiments described in the preceding figures so that the same reference numbers as before are used. Naturally, this does not restrict the embodiments described along FIG. 6 or indeed the methods according to the invention to only these above-described embodiments of the device 1 or the tower section 100.

The method Z comprises a first step X in which the tower section 100 is placed on the tower section storage device 1. Further, in an optional second step W the tower section 100 is secured, i.e. temporarily fixed, to the tower section storage device 1.

Further, there is shown a transport method Y for transporting the tower section 100. This transport method Y comprises the steps X and possibly W of the storage method Z and further a third step V in which the tower section 100 is transported on the tower section storage device 1, i.e. the two components are transported together as an assembly 200 according to the invention.

Although the described aspects have been disclosed in the form of particular embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A tower section storage device for storing a tower section of a wind turbine tower, comprising:
   a central body frame defining a center point;
   at least three feet, wherein at least one of the at least three feet is operably connected to the central body frame via a beam, the beam passing through a first opening on a first side of the central body frame and extending past the center point; and
   at least three tower section receiving areas operably connected to the central body frame, the at least three tower section receiving areas engaging the tower section of the wind turbine tower when the tower section is stored by the tower section storage device,
   wherein the at least one of the at least three feet is operably connected to the central body frame such that the at least one of the at least three feet is moved away from or towards the center point.

2. The tower section storage device according to claim 1, whereby the at least three tower section receiving areas are operably connected to the central body frame such that they are moved away from or towards the center point.

3. The tower section storage device according to claim 2, whereby a movement of the at least three tower section receiving areas is coupled to a movement of the at least three feet, such that a tower section receiving area each is connected to a corresponding foot at a predefined position relative to the corresponding foot.

4. The tower section storage device according to claim 1, whereby at least two of the at least three feet are operably connected to the central body frame such that the at least two of the at least three feet are moved along an angle of a circle which circle is defined by the center point of the central body frame.

5. The tower section storage device according to claim 1, whereby a width of the first opening of the central body frame is wider than a width of the beam to allow for lateral movement of the beam within the first opening to permit movement of the at least one of the at least three feet.

6. The tower section storage device according to claim 1, comprising a fixing means to temporarily fix at least one of the at least three feet and the at least three tower section receiving areas in a desired position with respect to the central body frame in at least one direction of movement.

7. The tower section storage device according to claim 1, wherein at least one tower section receiving area of the at least three tower section receiving areas that is connected to the at least one of the at least three feet is tiltable in at least one of the following directions:
   along a first essentially horizontal axis towards and away from the center point, and
   along a second essentially horizontal axis perpendicular to the first horizontal axis.

8. The tower section storage device according to claim 1, whereby at least one tower section receiving area of the at least three tower section receiving areas comprises a V-shaped interface configured to correspond to a counter-shape of a flange connection of two adjacent tower shell parts of the tower section to be stored.

9. The tower section storage device according to claim 1, further comprising an interface to a raising machine, the interface being positioned in the central body frame.

10. An assembly comprising a tower section of a wind turbine tower, and the tower section storage device according to claim 1.

11. The assembly according to claim 10, whereby the tower section is connected to the tower section receiving areas of the tower section storage device via a flange connection of two adjacent tower shell parts of the tower section.

12. The tower section storage device of claim 1, wherein at least one of the at least three feet extends out from a second opening on a second, opposing side of the central body frame.

13. The tower section storage device of claim 12, whereby a width of the first opening and the second opening of the central body frame is wider than a width of the beam to allow for lateral movement of the beam within the first opening and the second opening to permit movement of the at least one of the at least three feet.

14. A method for storing a tower section of a wind turbine tower, comprising the step of placing the tower section on a tower section storage device comprising:
   a central body frame defining a center point;
   at least three feet, wherein at least one of the at least three feet is operably connected to the central body frame via a beam, the beam passing through a first opening on a first side of the central body frame and extending past the center point; and
   at least three tower section receiving areas operably connected to the central body frame, the at least three tower section receiving areas engaging the tower section of the wind turbine tower when the tower section is stored by the tower section storage device,
   wherein the at least one of the at least three feet is operably connected to the central body frame such that the at least one of the at least three feet is moved away from or towards the center point.

15. The method of claim 14 further including transporting a tower section of a wind turbine tower, comprising the steps of storing the tower section and transporting the tower section on the device.

* * * * *

UNITED STATES PATENT AND TRADEMARK OFFICE
CERTIFICATE OF CORRECTION

PATENT NO. : 9,080,346 B2  
APPLICATION NO. : 14/274795  
DATED : July 14, 2015  
INVENTOR(S) : Birger Andersen

Page 1 of 1

It is certified that error appears in the above-identified patent and that said Letters Patent is hereby corrected as shown below:

On the Title Page

At Item (73), delete "AKTIENGESELLSCAFT" and insert -- AKTIENGESELLSCHAFT --

Signed and Sealed this
Twenty-fourth Day of November, 2015

Michelle K. Lee
*Director of the United States Patent and Trademark Office*